United States Patent
Petrovic et al.

(10) Patent No.: US 12,221,114 B2
(45) Date of Patent: Feb. 11, 2025

(54) METHOD FOR DETERMINING A DRIVING BEHAVIOUR AND METHOD FOR ADAPTING CONTROL ALGORITHMS OF AUTOMATED DRIVING SYSTEMS

(71) Applicant: MERCEDES-BENZ GROUP AG, Stuttgart (DE)

(72) Inventors: Andreas Petrovic, Stuttgart (DE); Cedric Perauer, Reutlingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/567,388

(22) PCT Filed: Apr. 20, 2022

(86) PCT No.: PCT/EP2022/060372
§ 371 (c)(1),
(2) Date: Dec. 6, 2023

(87) PCT Pub. No.: WO2022/258249
PCT Pub. Date: Dec. 15, 2022

(65) Prior Publication Data
US 2024/0326828 A1 Oct. 3, 2024

(30) Foreign Application Priority Data
Jun. 7, 2021 (DE) .................... 10 2021 002 909.7

(51) Int. Cl.
*B60W 40/09* (2012.01)
*B60W 60/00* (2020.01)

(52) U.S. Cl.
CPC ........ *B60W 40/09* (2013.01); *B60W 60/0059* (2020.02)

(58) Field of Classification Search
CPC .......................... B60W 40/09; B60W 60/0059
See application file for complete search history.

(56) References Cited

U.S. PATENT DOCUMENTS 10,146,224 B2   12/2018   Tafti et al.
2013/0158741 A1  6/2013   Hahne
(Continued)

FOREIGN PATENT DOCUMENTS

DE   102011121260 A1   6/2013
DE   102016007563 A1   2/2017
(Continued)

OTHER PUBLICATIONS

International Search Report and Written Opinion mailed Aug. 11, 2022 in related/corresponding International Application No. PCT/EP2022/060372.

(Continued)

*Primary Examiner* — Nabil H Syed
*Assistant Examiner* — Cal J Eustaquio
(74) *Attorney, Agent, or Firm* — PATENT PORTFOLIO BUILDERS PLLC (57) ABSTRACT

A method for determining a driving behavior of a driver relative to a driving behavior of an automated driving system of a vehicle involves detecting actuating commands from the driver and a manually navigated trajectory of the vehicle during manual driving operation of the vehicle. In a first calculation path, it is determined as to which automated actuating commands the automated driving system would generate in a respectively current actual position of the vehicle on the manually navigated trajectory if the automated driving system were active. In a second calculation path, a trajectory of the vehicle which the vehicle would cover with the automated driving system active is simulated. Depending on the detected actuating commands, the automated actuating commands, the manually navigated trajectory, and/or the simulated trajectory, at least one score value is determined as a measure of a discrepancy between the (Continued)

driving behavior of the driver and that of the automated driving system.

5 Claims, 6 Drawing Sheets

(56) References Cited

U.S. PATENT DOCUMENTS

2015/0175168 A1    6/2015  Hoye et al.
2022/0027646 A1*  1/2022  Giralt .................... G08B 21/06

FOREIGN PATENT DOCUMENTS

| | | |
|---|---|---|
| DE | 102015218361 A1 | 3/2017 |
| DE | 102017126021 A1 | 5/2018 |
| DE | 102017200180 A1 | 7/2018 |
| DE | 102018204101 A1 | 9/2019 |
| DE | 102018128890 A1 | 5/2020 |
| DE | 102019202106 A1 | 8/2020 |
| DE | 102019206908 A1 | 11/2020 |
| DE | 102019129904 A1 | 5/2021 |
| EP | 3428031 A1 | 1/2019 |

OTHER PUBLICATIONS

Office Action created Oct. 12, 2021 in related/corresponding DE Application No. 10 2021 002 909.7.

* cited by examiner

METHOD FOR DETERMINING A DRIVING BEHAVIOUR AND METHOD FOR ADAPTING CONTROL ALGORITHMS OF AUTOMATED DRIVING SYSTEMS

BACKGROUND AND SUMMARY OF THE INVENTION

Exemplary embodiments of the invention relate to a method for determining a driving behavior of a driver in relation to a driving behavior of an automated driving system of a vehicle, as well to a method for adapting control algorithms of automated driving systems of vehicles of a vehicle fleet, and to a device for adapting control algorithms of automated driving systems of vehicles of a vehicle fleet.

DE 10 2015 218 361 A1 discloses a method for verifying a vehicle function intended to guide a vehicle in longitudinal and transverse directions. The method comprises:
Determining a test control instruction of the vehicle function to an actuator of the vehicle based on data relating to the surroundings of the vehicle,
Determining that a driver of the vehicle is carrying out an actual control instruction differing from the test control instruction, which actual control instruction is actually being executed by the actuator,
Simulating an imaginary traffic situation that would exist if, instead of the actual control instruction, the test control instruction had been executed, based on data on the surroundings,
Specifying whether the imaginary traffic situation represents a relevant event for a road user in the surroundings of the vehicle or for the vehicle; and
Providing test data relating to the imaginary traffic situation if it has been specified that the imaginary traffic situation represents a relevant event for a road user in the surroundings of the vehicle or for the vehicle.

Exemplary embodiments of the invention provide a novel method for determining a driving behavior of a driver in relation to a driving behavior of an automated driving system of a vehicle. Exemplary embodiments of the invention also provide a novel method for adapting control algorithms of automated driving systems of vehicles of a vehicle fleet. Exemplary embodiments of the invention further provide a novel device for adapting control algorithms of automated driving systems of vehicles of a vehicle fleet.

In the method for determining a driving behavior of a driver in relation to a driving behavior of an automated driving system of a vehicle, according to the invention, actuating commands from the driver and a manually navigated trajectory of the vehicle are detected during manual driving operation of the vehicle. In a first calculation path, a determination is performed as to which automated actuating commands the automated driving system would generate in a respectively current actual position of the vehicle on the manually navigated trajectory if the automated driving system were active. In a second calculation path, a trajectory of the vehicle that the vehicle would cover with the automated driving system active is simulated. Depending on the detected actuating commands from the driver, the automated actuating commands, the manually navigated trajectory, and/or the simulated trajectory, a score value is determined as a measure of a discrepancy between the driving behavior of the driver and the driving behavior of the automated driving system.

Concepts for optimizing automated driving systems by means of what is referred to as an imitation method are widely known in a development of automated, in particular highly automated or self-driving vehicles. Here, a driving style of a driver is taken as the ideal and a behavior algorithm is trained via a record of their behavior. The aim of this is to imitate the driving behavior of the driver. In future generations of automated driving systems, the performance of driving systems will surpass the performance of safe average drivers. Using the present method, a discrepancy established in this way between the driving behavior of the driver and the driving behavior of the automated driving system can be specified reliably and precisely.

It is possible to distinguish here between different functionalities of the automated driving system, for example an entry-level variant and a variant with full functionality. It is therefore possible to achieve a high correlation between the driving behavior of automated driving systems with different functionalities and the driving behavior of the driver. The method enables the driving behavior to be calculated in metrics in order to provide a classification of the driving behavior of the driver. It is possible to provide here a record distinguishing between the capabilities of the automated driving system and those of the driver which enables the discrepancy to be calculated, in particular for each driving situation. This calculated discrepancy can be used to generate an overview for the driver.

The precise calculation and specification of the discrepancy between the respective driving behavior of the driver and of the automated driving system is required for subsequent applications. If, for example, the driver is using only a reduced basic version or entry-level variant of the automated driving system, it is possible to calculate the driving situations in which they might use a more fully fledged driving system, in other words a driving system with greater functionality. It is also possible to indicate traffic situations in which, or navigated roads on which, the driving system would have driven more safely or equivalently in order to increase faith in the automated driving systems. The information on an ability of the driver can also be used to optimize what are referred to as safety-assistance systems for the respective driver. Comprehensive information on the performance of the driver and of the system can be accumulated and used for a scoring system.

In one possible embodiment of the method, the score value is determined depending on a difference between the detected actuating commands from the driver and the automated actuating commands. This enables a simple and reliable determination of the score value.

In a further possible embodiment of the method, the score value is determined depending on a difference between the manually navigated trajectory and the simulated trajectory. This also enables a simple and reliable determination of the score value.

In a further possible embodiment of the method, the score value is determined depending on a length of time or distance that the vehicle can travel until the difference between the manually navigated trajectory and the simulated trajectory reaches a prescribed threshold. This also enables a simple and reliable determination of the score value, a time, and/or a position of the difference between the manually navigated trajectory and the simulated trajectory being determined so that positions in which there is frequently a statistically relevant discrepancy between the driving behavior of the driver and the driving behavior of the automated driving system can be determined.

In a further possible embodiment of the method, the difference between the manually navigated trajectory and the simulated trajectory is determined using at least one cost function. Different cost functions can be used individually or in combination here, the cost functions factoring in, for example, a square error, an absolute error, a speed-weighted absolute error, a cumulative speed-weighted absolute error, a quantized classification error, and/or a threshold relative error. By means of the at least one cost function, the difference and, following therefrom, the score value can be determined simply and reliably, the respective cost function easily being able to be adapted to a complexity of the task by enhancement.

In a further possible embodiment of the method, the score value is determined depending on a probability that the automated driving system would, at an earlier time, have specified as the desired trajectory a trajectory that at least substantially corresponds to the manually navigated trajectory. This also enables a simple and reliable determination of the score value.

In a further possible embodiment of the method, the score value is determined by summation, for example including weighted summation, of a plurality of score values each determined according to one of the abovementioned embodiments, as a summed score value. This summed score value indicates, in particular, how significantly a driving style of the driver differs from the driving style of the automated driving system. This information can be used to determine a current driving performance of the driver, in particular to determine whether the driver is not concentrating and/or is driving unsafely. This enables active safety systems of the vehicle to be adapted to a possibly reduced driving performance of the driver. The driver can also be offered an activation of an automated driving system because it is able to handle a current driving task better than the driver themself.

In the method for adapting control algorithms of automated driving systems of vehicles of a vehicle fleet, according to the invention, score values of a plurality of vehicles of the vehicle fleet are compiled. The score values are determined by the vehicles and each give a measure of a discrepancy between a driving behavior of a driver of the vehicle and a driving behavior of an automated driving system in a respective position of the vehicle. The compiled score values are statistically evaluated and, in the statistical evaluation, positions are determined in which there is frequently a statistically relevant discrepancy between the driving behavior of the driver and the driving behavior of the automated driving system. Based on a determined frequency of statistically relevant discrepancies, parameters of the control algorithms of the automated driving systems are adapted to reduce the discrepancies and the adapted parameters are made available to the vehicles of the vehicle fleet. This enables a simple and reliable adapting of the control algorithms of automated driving systems and therefore improved performance and reliability of the automated driving systems.

In a possible embodiment of the method for adapting control algorithms of automated driving systems, a respective score value is determined in the method described above for determining a driving behavior of a driver in relation to a driving behavior of an automated driving system of a vehicle or in a possible embodiment of this method, which results in a particularly simple and reliable determination of the score value.

BRIEF DESCRIPTION OF THE DRAWING FIGURES

Exemplary embodiments of the invention are described in more detail below by reference to drawings, in which.

Parts corresponding to one another have been provided with the same reference numerals in all the figures.

DETAILED DESCRIPTION

Figure 1:
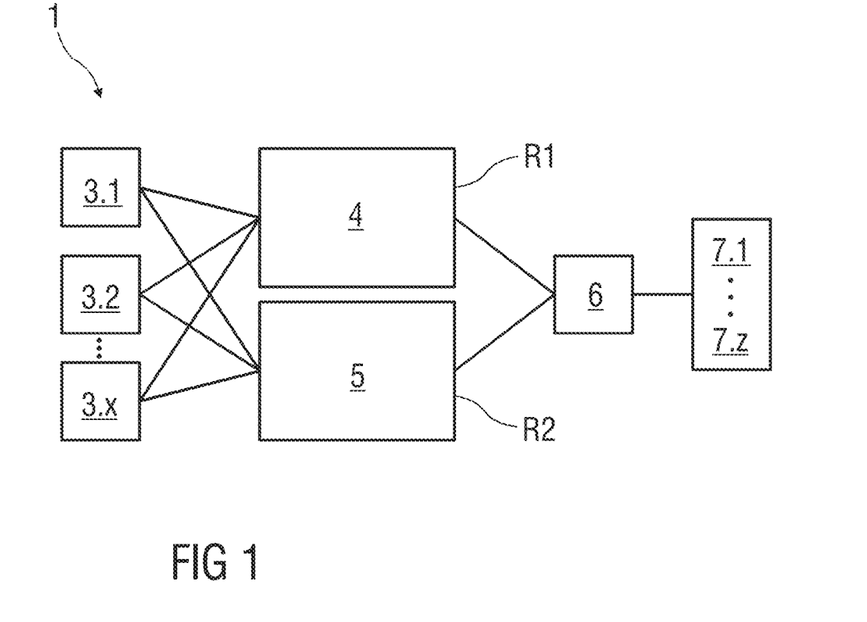
FIG. 1 shows a schematic depiction of a block diagram of an exemplary embodiment of a device for the automated driving operation of a vehicle.
Figure 5:
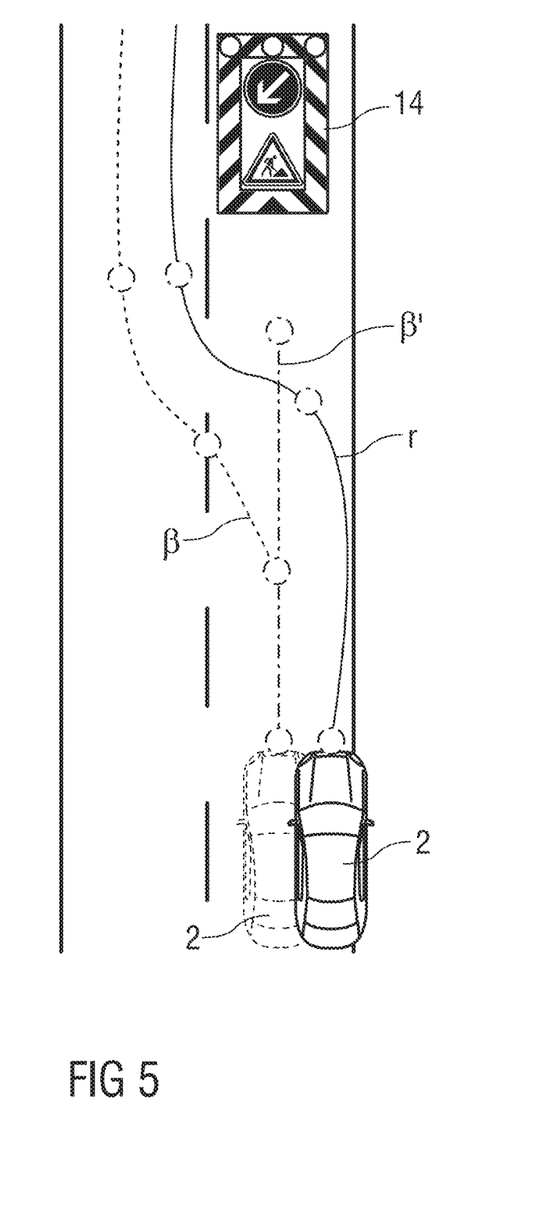
FIG. 5 shows a schematic depiction of a traffic situation from above.

FIG. 1 is a block diagram of a possible exemplary embodiment of a device 1 for the automated, in particular highly automated or autonomous, driving operation of a vehicle 2 shown in FIG. 5.

Vehicle 2 has fully fledged hardware for the automated driving operation here, it being possible for performance of the hardware to be limited in terms of the software to different enhancement levels. It can be limited to at least two enhancement levels, for example a basic enhancement level and a high enhancement level. These enhancement levels differ here in terms of their predefined performance, which differs in respect of their ability to handle different application scenarios, what are referred to as use cases.

The device 1 comprises a plurality of sensors 3.1 to 3.$x$ provided to detect the surroundings and at least two computer units 4, 5 provided at what is referred to as a control device level, which each form a redundancy for the other respective computer unit 4, 5. The device 1 further comprises a comparator 6 and actuators 7.1 to 7.$z$.

The sensors 3.1 to 3.$x$ are provided to detect a vehicle's surroundings.

The computer units 4, 5 are provided independently of one another to determine and generate trajectory trees with a plurality of possible trajectories $\beta$, $\beta'$ (shown in FIG. 5) and select a desired trajectory from a trajectory tree by means of an optimization algorithm. The computer units 4, 5 are also provided independently of one another to determine and generate driving commands to control the vehicle 2 in automated driving operation using sensor data detected by means of the sensors 3.1 to 3.$x$ along the selected desired trajectory and, through the formation of the redundancy, enable prescribed safety requirements to be met for the automated driving operation of the vehicle 2, in particular of a vehicle 2 with a high degree of automation. The computer units 4, 5 are each located in a calculation path R1, R2 here.

The actuators 7.1 to 7.z are provided to carry out the driving commands generated by the computer units 4, 5.

The computer units 4, 5 are coupled to all sensors 3.1 to 3.x and the comparator 6 is coupled to both computer units 4, 5 here. The driving commands calculated by both computer units 4, 5 from the sensor data can therefore be made available to the comparator 6 for comparison with the calculation redundantly carried out by the computer units 4, 5. Using widely known safety algorithms, the comparator 6 specifies a safe driving command or a safe control signal from its input data here and transmits this to the actuators 7.1 to 7.z. The comparator 6 is provided independently of the hardware here, for example according to norm ISO 26262 in ASIL-D (ASIL=Automotive Safety Integrity Level).

Figure 2:
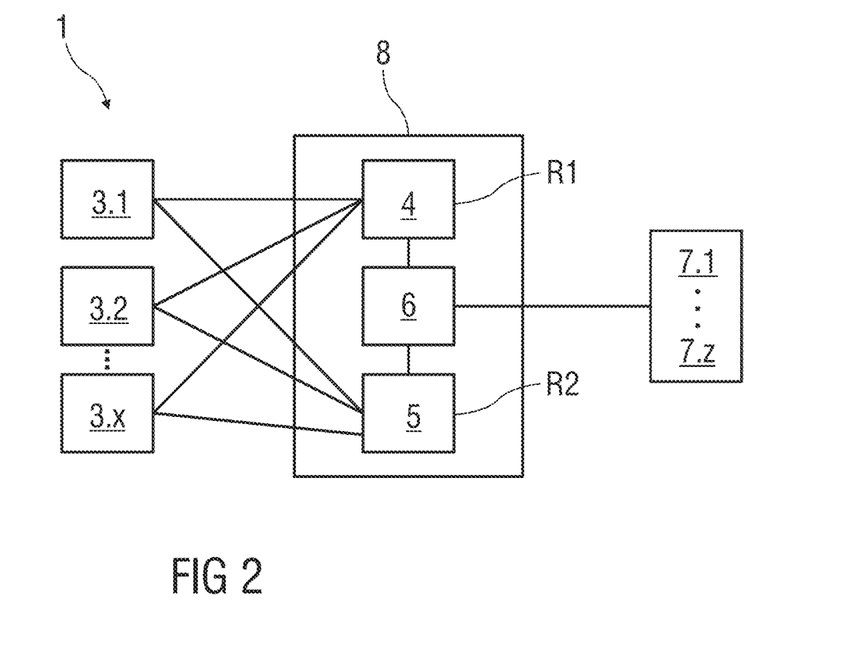
FIG. 2 shows a schematic depiction of a block diagram of a further exemplary embodiment of a device for the automated driving operation of a vehicle.

FIG. 2 shows a block diagram of a further possible exemplary embodiment of a device 1 for the automated driving operation of the vehicle 2.

Unlike the exemplary embodiment depicted in FIG. 1, the computer units 4, 5 and the comparator 6 are provided in a shared control device 8 and are formed from at least two redundantly operating computing cores that are independent of one another at chip level, for example separate semiconductors, processors, systems on a chip, etc.

Figure 3:
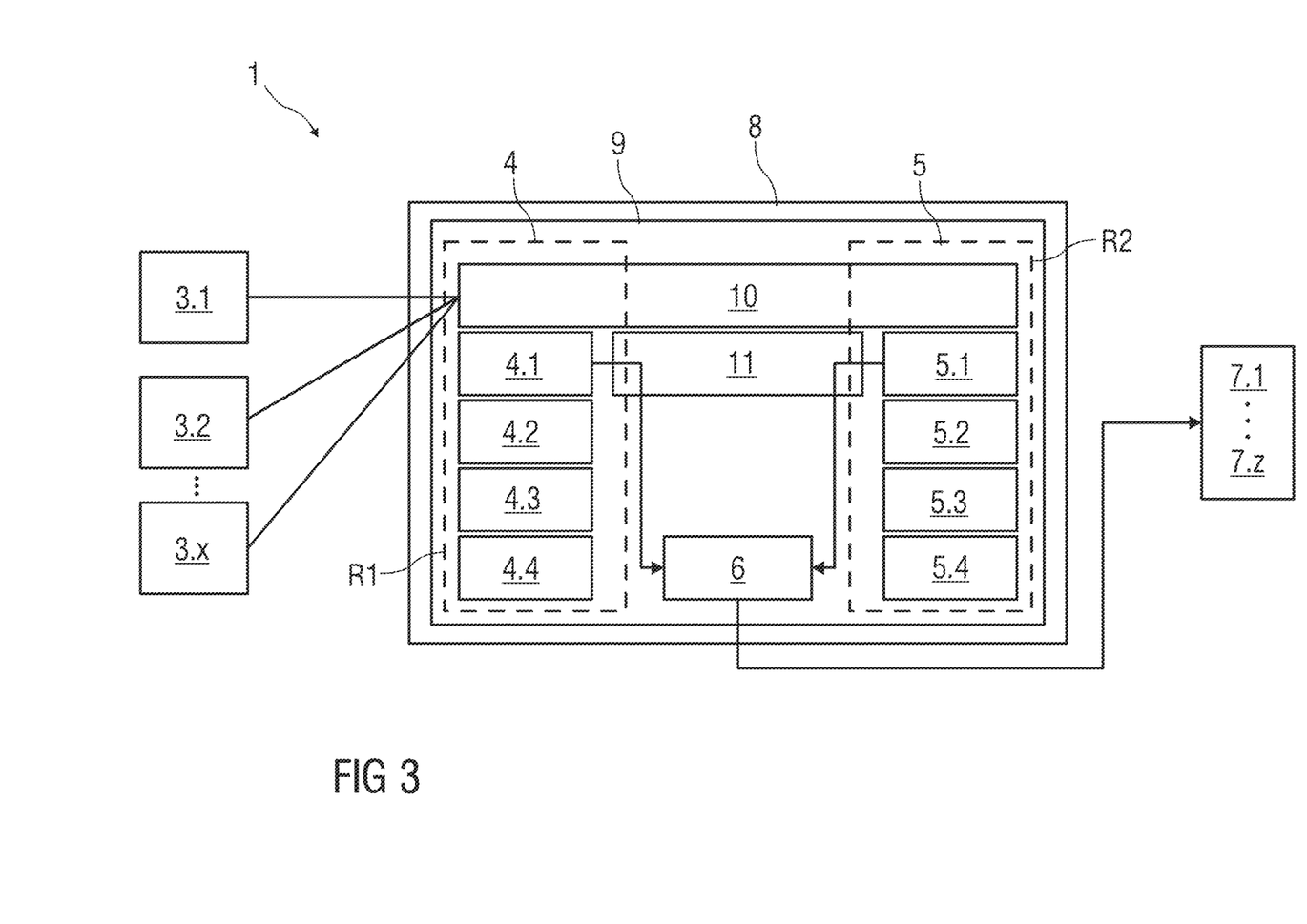
FIG. 3 shows a schematic depiction of a block diagram of a further exemplary embodiment of a device for the automated driving operation of a vehicle.

FIG. 3 depicts a block diagram of a further possible exemplary embodiment of a device 1 for the automated driving operation of the vehicle 2.

Unlike the exemplary embodiment depicted in FIG. 2, the computer units 4, 5 in the shared control device 8 are provided as a system on a chip on a shared computing core 9 as a redundant multi-core architecture with a shared input/output 10 which receives the sensor data and outputs it to the computer units 4, 5, and a communication unit 11, also referred to as inter-fabric.

Every computer unit 4, 5 here comprises, in particular, a CPU 4.1, 5.1, a GPU 4.2, 5.2, an NPU 4.3, 5.3, and a memory 4.4, 5.4.

To carry out a method to determine a driving behavior of a driver in relation to a driving behavior of an automated driving system of the vehicle 2, use is made of the redundancy present in the device 1 and this is modified according to the following steps. The steps here apply to all the above mentioned and further suitable exemplary embodiments of the device 1.

The aim of the method here is to determine and to quantify the driver's performance relating to a driving task using the device 1 for the automated driving operation of the vehicle 2.

Figure 4:
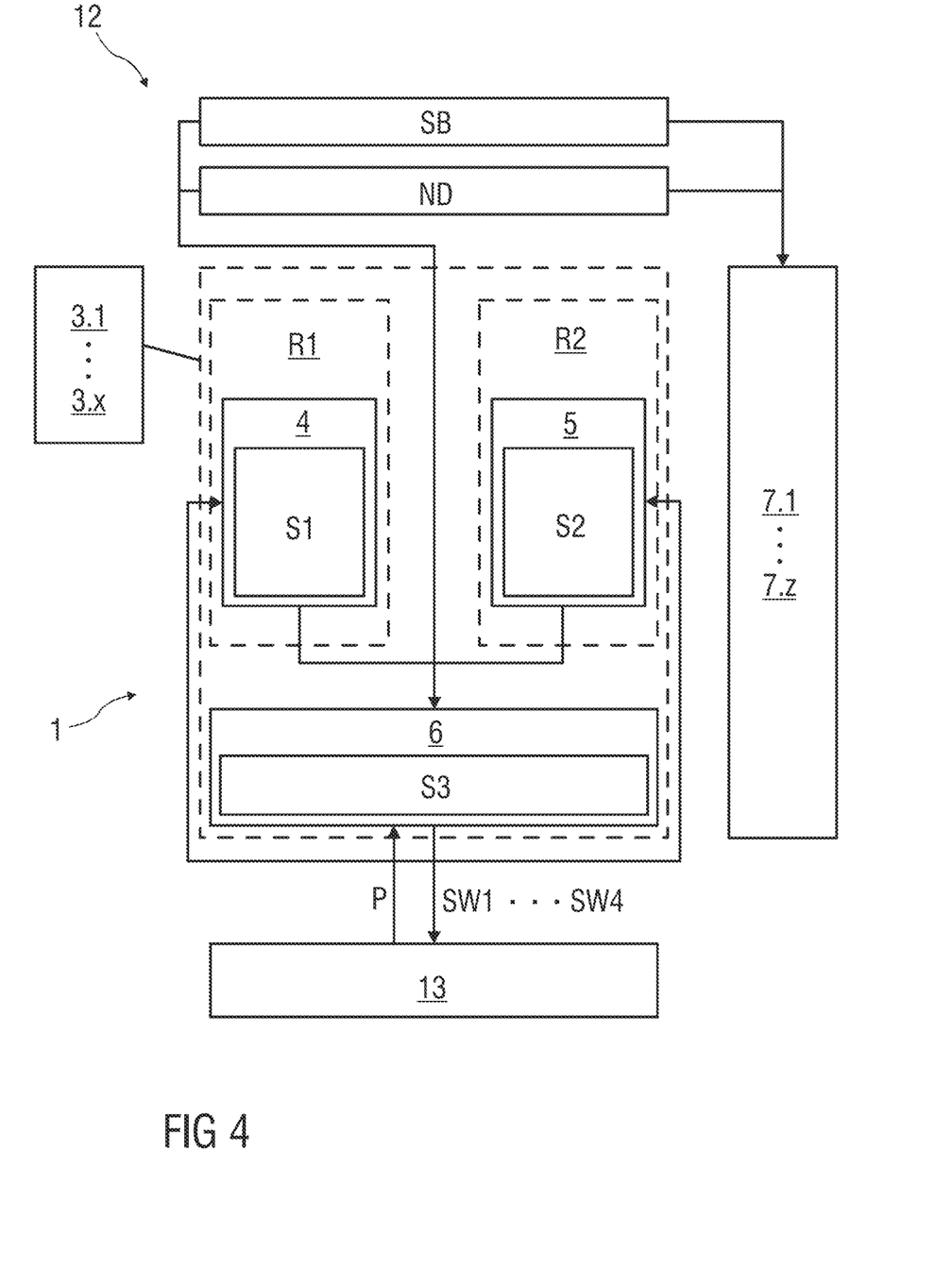
FIG. 4 shows a schematic depiction of a block diagram of a device for determining a driving behavior of a driver in relation to a driving behavior of an automated driving system of a vehicle.

FIG. 4 shows a block diagram of a device 12 for determining a driving behavior of a driver in relation to a driving behavior of an automated driving system of a vehicle 2, the device 12 comprising a device 1 for the automated driving operation of the vehicle 2 according to FIGS. 1 to 3.

The device 12 is provided here such that, during a manual driving operation of the vehicle 2 carried out by the driver, an assisting system (basic enhancement level) or highly automated system (high enhancement level) run by the device 1 is run in the background in full apart from the control of the actuators 7.1 to 7.z. This means that all sensors 3.1 to 3.x and additional hardware and software algorithms are run as if they were controlling the vehicle 2 in automated operation. Only the control itself is not carried out. Instead, a drive and the actuators 7.1 to 7.z are controlled not by the device 1, but by the driver. In such background or passive operation, the vehicle 2 is therefore controlled by the driver, with the latter transmitting actuating commands to the actuators 7.1 to 7.z and the drive through a steering system, pedals, and any other input means. In the scenarios as a whole, the driver will differ in their driving style from the driving style of the device 1.

In passive operation, the device 1 calculates actuating and steering commands and trajectories $\beta$, $\beta'$ depicted in more detail in FIG. 5 in real time here by means of the first computer unit 4 in the first calculation path R1 in a signal formation S1. The sensors 3.1 to 3.x, for example radar sensors, lidar sensors, cameras, inertial measurement units, position detection systems, etc., supply input signals for this. The device 1 locates itself here in real time and calculates the actuating commands for steering, braking, and driving the vehicle 2 and the planned trajectory $\beta$, $\beta'$.

In other words, in the first calculation path R1, a determination is performed as to which automated actuating commands the automated driving system would generate in a respectively current actual position of the vehicle 2 on a manually navigated trajectory r depicted in more detail in FIG. 5 if the automated driving system were active.

The results of the signal formation S1 are forwarded to the comparator 6. This is carried out at every time step from the beginning according to a permanent initialization.

Since the system cannot move off its planned trajectory $\beta$, $\beta'$ as a result of the passive operation, there is a difference between positions actually navigated by the driver and positions expected by the system. These errors would add up over time and lead to a breakdown of the system. For this reason, in the first calculation path R1, at each time step, the system corrects the real-time information and adapts the newly generated actuating commands according to the really navigated situation.

Because no redundancy is required in passive operation, the second computer unit 5 is used, in the second calculation path R2, in a simulation operation S2, to simulate a trajectory $\beta$, $\beta'$ of the vehicle 2 as if the vehicle 2, beginning from a starting point, had driven off the trajectory $\beta$, $\beta'$ determined in the first calculation path R1, not that of the driver. The simulation results are likewise forwarded to the comparator 6.

In other words, in the second calculation path R2, a trajectory $\beta$, $\beta'$ of the vehicle 2 which the vehicle 2 would cover with the automated driving system active is simulated.

A summed error resulting from a difference between the trajectory r really navigated and the trajectory $\beta$, $\beta'$ determined in the first calculation path R1 is compensated for up to a threshold value by a simulated input and then compared with the performance of the driver.

Within the comparator 6, an algorithm calculates score values SW1 to SW4 for the driver and returns the results to both computer units 4, 5. A calculation S3 of the score values SW1 to SW4 is carried out depending on the detected actuating commands SB from the driver and navigation data ND, the automated actuating commands, the manually navigated trajectory r and the simulated trajectory $\beta$, $\beta'$, the score values SW1 to SW4 giving a measure of a discrepancy between the driving behavior of the driver and the driving behavior of the automated driving system. In other words, in particular, executed manual actuating commands and non-executed automated actuating commands, as well as the navigated trajectory r and the simulated trajectory $\beta$, $\beta'$, are evaluated in order to determine the extent to which the driving behavior of the driver differs from the driving behavior which would result in the case of automated driving operation in the same surroundings.

The score values SW1 to SW4 determined by the comparator 6 are also transmitted to a backend 13. Compiled in the latter are score values SW1 to SW5 of a plurality of vehicles 2 of a vehicle fleet, the score values SW1 to SW4 being determined, in particular, by the vehicles 2 according to the previous description. The compiled score values SW1 to SW4 are also statistically evaluated, positions being determined in the statistical evaluation in which there is frequently a statistically relevant discrepancy between the driving behavior of the driver and the driving behavior of the automated driving system. Based on a determined frequency of statistically relevant discrepancies, parameters P of the control algorithms of the automated driving systems are then adapted to reduce the discrepancies and the adapted parameters P are made available to the vehicles 2 of the vehicle fleet.

FIG. 5 depicts a traffic situation viewed from above with a vehicle 2 which is approaching an obstacle 14.

The vehicle 2 is being controlled here according to the description of FIG. 3 by the driver in manual driving operation and is really following a trajectory r here.

At the same time, likewise similarly to the description according to FIG. 3, a trajectory β' is calculated by the device 12 at the basic enhancement level and the trajectory β is calculated by the device 12 at the high enhancement level, in other words as a highly automated system, the highly automated system being able to carry out more complex maneuvers than a system at the basic enhancement level.

Figure 6:
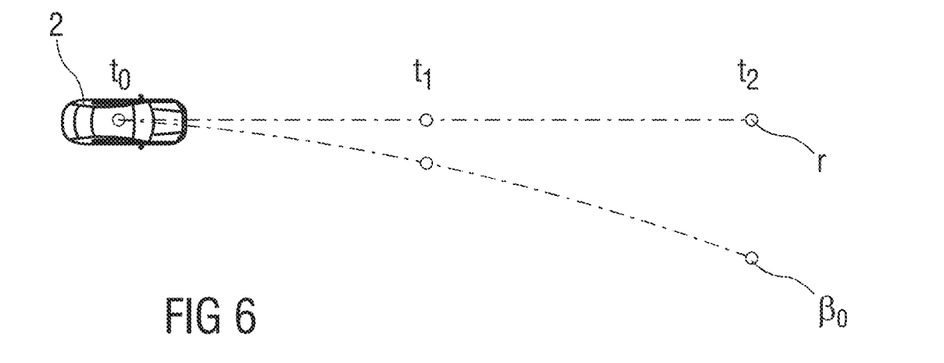
FIG. 6 shows a schematic depiction of a real trajectory of a vehicle during manual driving operation and a trajectory simulated during this driving operation.

FIG. 6 shows a trajectory r actually navigated by a vehicle 2 during a manual driving operation thereof and a trajectory $ß_0$ simulated during this driving operation at different times $t_0$ to $t_2$.

To specify a first score value SW1, the first computer unit 4 determines as the desired trajectory a trajectory $ß_0$ in the first calculation path R1 at a first time $t_0$ starting from a current actual vehicle position at that time $t_0$. The trajectory r lies in the future and is not available as information. The computer unit 4 also determines the actuating commands that have to be generated in the current actual vehicle position for the actuators 7.1 to 7.z if the vehicle 2 is supposed to be guided along the trajectory $ß_0$.

The difference between the manual actuating commands SB generated by the driver in the vehicle actual position and the automated actuating commands generated by the first computer unit 4 in the same position is then determined. The difference between what the driver does in the actual vehicle position and what the first computer unit 4 would do in the actual vehicle position is therefore determined.

In the simplest case, the difference can be determined through subtraction. If there are a number of values for the difference, a mean difference can be determined by averaging. For example, it is possible to weight a difference between actuating commands for a longitudinal movement of the vehicle 2 and a difference between actuating commands for a transverse movement of the vehicle 2 differently during averaging, in particular to weight them depending on speed. Averaging may comprise providing an arithmetic mean or a quadratic average here.

For the determined difference, the first score value SW1 is determined, for example by means of a prescribed look-up table. The bigger the determined difference is, the bigger this first score value SW1 is.

The first score value SW1 is therefore a measure for the difference between the manual actuating commands SB and the automated actuating commands that the automated driving system would carry out if it were active.

The procedure described here for determining the first score value SW1 is repeated cyclically.

Figure 7:
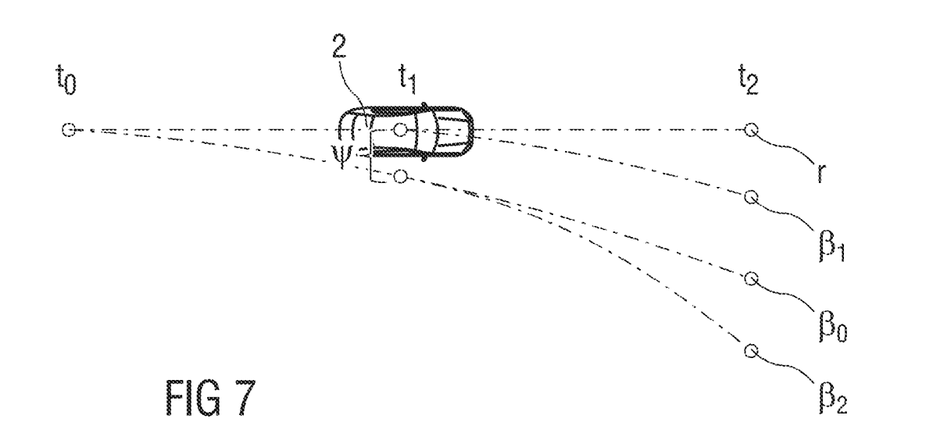
FIG. 7 shows a schematic depiction of a real trajectory of a vehicle during manual driving operation and trajectories simulated during this driving operation.

FIG. 7 depicts a trajectory r actually navigated by a vehicle 2 during a manual driving operation thereof and trajectories $ß_0, ß_1, ß_2$ simulated during this driving operation at different times $t_0$ to $t_2$.

The actual vehicle position at the first time $t_0$ is the starting position for the simulation carried out in the second computer unit 5. The trajectory $ß_0$ provided as the desired trajectory along which the vehicle 2 is supposed to move is determined at the first time $t_0$ here.

Through the simulation, a simulated position is determined in which the vehicle 2 will be located one time step later, at time $t_1$. At time $t_1$, the difference between the actual vehicle position at this time $t_1$ and the simulated position determined for this time $t_1$ is determined.

At time $t_1$, a new trajectory $ß_2$ provided as the desired trajectory is calculated which may theoretically correspond to the previously determined trajectory $ß_0$. The calculation is based on the new sensor data detected at this time $t_1$ and on the assumption that the vehicle 2 is actually located in the simulated position at time $t_1$.

These calculation steps are repeated for the next time steps until the determined difference exceeds a prescribed threshold $\xi$. This is the case, for example, at a time $t_x$. One time step later, at time $t_{x+1}$, the simulation is restarted with the then current actual vehicle position as the new starting position. This is necessary since a drift between the simulated position and the real sensor data results in a parallax which can no longer be compensated for at and beyond the threshold $\xi$.

The differences determined for the times $t_1$ to $t_x$ are evaluated with a cost function $\Psi$ according to the following table, for example with the mean square error function:

TABLE 1

| Metric name | Parameters | Metric definition |
| --- | --- | --- |
| Squared error | — | $\frac{1}{|V|}\sum_{i \in V} \|\alpha_i - \hat{\alpha}_i\|^2$ |
| Absolute error | — | $\frac{1}{|V|}\sum_{i \in V} \|\alpha_i - \hat{\alpha}_i\|_1$ |
| Speed-weighted absolute error | — | $\frac{1}{|V|}\sum_{i \in V} \|\alpha_i - \hat{\alpha}_i\|_1 v_i$ |
| Cumulative speed-weighted abolute error | T | $\frac{1}{|V|}\sum_{i \in V} \left\|\sum_{t=0}^{T}(\alpha_{i+t} - \hat{\alpha}_{i+t})v_{i+t}\right\|_1$ |
| Quantized classification error | $\sigma$ | $\frac{1}{|V|}\sum_{i \in V}(1 - \delta(Q(\alpha_i, \sigma), Q(\hat{\alpha}_i, \sigma)))$ |
| Thresholded relative error | $\alpha$ | $\frac{1}{|V|}\sum_{i \in V} \theta(\|\hat{\alpha}_i - \alpha_i\| - \alpha\|\alpha_i\|)$ |

For the result obtained here, a second score value SW2 is determined, for example by means of a look-up table.

The second score value SW2 is therefore a measure for the difference between the trajectory r actually navigated and the trajectory $ß_0, ß_1, ß_2$ simulated in the second computer unit 5.

The second score value SW2 is recorded, for example, in a matrix, all trajectories $ß_x$ to r over all $t_x$ and the cost function $\Psi$ depending thereon being the entries. The summation of all matrices to give the second score value SW2 according to $$\begin{pmatrix} \Psi\left(\beta_0\left(\sum_{\Psi \geq \xi} t_i\right)\right) \\ \vdots \\ \Psi\left(\beta_i\left(\sum_{\Psi \geq \xi} t_i\right)\right) \end{pmatrix} \quad (1)$$

is used to determine overall performance and transmitted to the backend 13. The more divergent the trajectories $\beta_x$ are from the trajectory r really navigated, in other words the cost function $\Psi$ rises, the poorer the second score value SW2 for the driver becomes.

Figure 8:
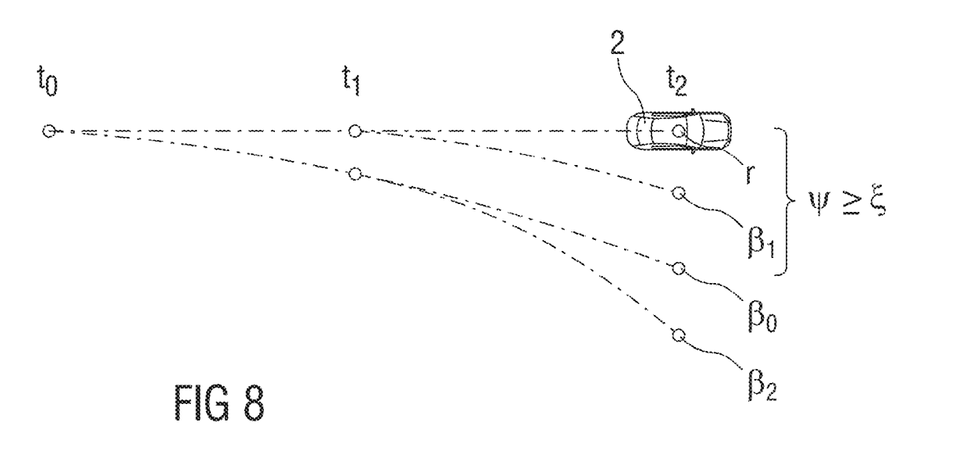
FIG. 8 shows a schematic depiction of a real trajectory of a vehicle during manual driving operation and trajectories simulated during this driving operation.

FIG. 8 depicts a trajectory r actually navigated by a vehicle 2 during a manual driving operation thereof and trajectories $\beta_0$, $\beta_1$, $\beta_2$ simulated during this driving operation at different times $t_0$ to $t_2$.

If the cost function Y for the trajectory $\beta_0$ exceeds the threshold $\xi$, a current simulation cycle in the second calculation path R2 is brought to an end. A completed time step period is incorporated into a third score value SW3. The longer the trajectory $\beta_0$ lies below the threshold $\xi$, the better the third score value SW3 is for the driver.

In other words, it is determined how long or how far the vehicle 2 can drive from the first time $t_0$ until the difference between the actual vehicle position and the position simulated by the second computer unit 5 exceeds the prescribed threshold $\xi$. The length of time taken between the times $t_0$ and $t_x$ or the distance covered by the vehicle 2 during this length of time is therefore determined. For the determined length of time or distance, the third score value SW3 is determined, for example by means of a look-up table.

The third score value SW3 is therefore a measure for the length of time or distance which the vehicle 2 can travel until the difference between the manually navigated trajectory r and the simulated trajectory $\beta_x$ reaches the prescribed threshold $\xi$.

Figure 9:
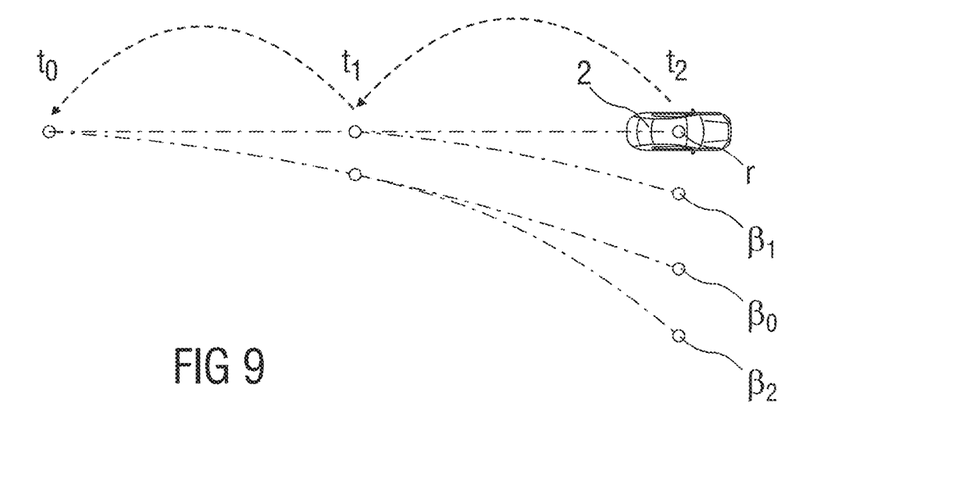
FIG. 9 shows a schematic depiction of a re-simulation of a probability of a real trajectory of a vehicle.

Before the simulation starts again in the second calculation path R2, a re-simulation according to FIG. 9 is carried out at time $t_x$ at which the prescribed threshold $\xi$ for the simulated trajectory $\beta_x$ was exceeded. Here, the real vehicle position and a real vehicle status at time $t_x$, in the present case at time $t_2$, are used to infer which conditions would have had to have been met for the system to have gone from a real status at time $t_2$ to a status in automated operation at the same time $t_2$.

In the decision space at time $t_0$, all potentially possible trajectories $\beta_x$ are given a probability weighting. The system selects the trajectory $\beta_x$ with the best probability and this is output as trajectory $\beta_0$.

All potentially navigable trajectories $\beta_x$ a spread across a decision space in the system. Trajectories $\beta_x$ that are improbable in a statistical sense are rejected.

To calculate a fourth score value SW4, the probability weighting of the actually navigated trajectory r is calculated retrospectively in the decision space. In other words, the probability originally calculated by the system for the trajectory r of the driver before it was navigated. The poorer the weighting of the real trajectory r, the poorer the fourth score value SW4 for the driver.

In other words, if the prescribed threshold $\xi$ is exceeded at time $t_x$, the probability that the first computer unit 4 would at an earlier time $t_0$, $t_1$, $t_2$ have selected from the trajectory tree as the desired trajectory a trajectory $\beta_x$ that substantially corresponds to the actually covered trajectory r is determined retrospectively. For the determined probability, the fourth score value SW4 is specified, for example using a look-up table.

The four determined score values SW1 to SW4 are then summed. A weighted summation is likewise conceivable. The summed score value indicates how significantly the driving style of the driver differs from the driving style of the automated driving system. This information can be used to determine the current driving performance of the driver, in particular to determine whether the driver is not concentrating and is driving unsafely, and to adapt active safety systems to a possibly reduced driving performance of the driver or to offer the driver the activation of the automated driving system because it is currently driving more safely than the driver.

The summed score value, together with the position in which it was determined can also be fed to the backend 13. It is then possible to determine through statistical evaluation at the backend 13 whether there is any frequency of the discrepancies between the driving styles of many drivers and the driving style of the automated driving system in a specified position in order, if applicable, to improve the algorithms of the automated driving system.

If, for example, it is found that the driving behavior of the driver frequently differs significantly from the driving behavior of the automated driving system at a roundabout, then this information can be used as an indication that it would be sensible to optimize the algorithms of the driving system for operation at this roundabout.

If the driver is competent, then it is possible to recognize from the score values SW1 to SW4 whether the automated driving system is behaving as well as the competent driver or worse than the competent driver. The score values SW1 to SW4 can then be used to optimize the algorithms of the automated driving system such that the driving behavior of the automated driving system is aligned with the driving behavior of the competent driver.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining a driving behavior of a driver in relation to a driving behavior of an automated driving system of a vehicle, wherein, during manual driving operation of the vehicle, the method comprises:
   detecting actuating commands from the driver and a manually navigated trajectory of the vehicle;
   determining, for a first calculation path, which automated actuating commands the automated driving system would generate in a respectively current actual position of the vehicle on the manually navigated trajectory if the automated driving system were active;

simulating, in a second calculation path, a trajectory of the vehicle which the vehicle would cover with the automated driving system active; and determining, depending on the detected actuating commands from the driver, the automated actuating commands, the manually navigated trajectory, or the simulated trajectory, at least one score value as a measure of a discrepancy between the driving behavior of the driver and the driving behavior of the automated driving system, wherein the at least one score value is determined depending on a probability that the automated driving system would, at an earlier time, have specified as the desired trajectory a trajectory that at least substantially corresponds to the manually navigated trajectory.

2. The method of claim 1, wherein the at least one score value is determined depending on a difference between the detected actuating commands from the driver and the automated actuating commands.

3. The method of claim 1, wherein the at least one score value is determined depending on a difference between the manually navigated trajectory and the simulated trajectory.

4. The method of claim 3, wherein the at least one score value is determined depending on a length of time or distance which the vehicle can travel until the difference between the manually navigated trajectory and the simulated trajectory reaches a prescribed threshold.

5. The method of claim 3, wherein the difference between the manually navigated trajectory and the simulated trajectory is determined based on at least one cost function.

* * * * *